O. JENSEN.
SCISSORS.
APPLICATION FILED MAR. 15, 1907.
906,632.
Patented Dec. 15, 1908.
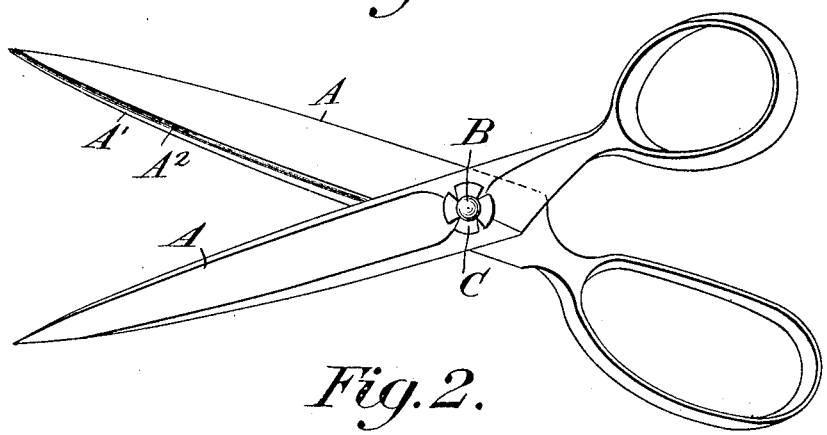
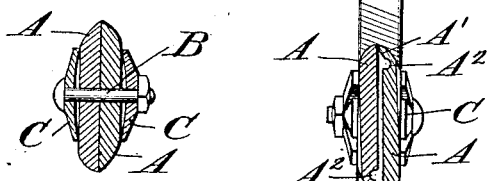
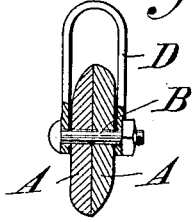
Witnesses
Phil. E. Barnes
E. B. McBath
Inventor
Ole Jensen.
By O'Meara & Broch
Attorney
THE NORRIS PETERS CO., WASHINGTON, D. C.

UNITED STATES PATENT OFFICE.

OLE JENSEN, OF CHICAGO, ILLINOIS.

SCISSORS.

No. 906,632.    Specification of Letters Patent.    Patented Dec. 15, 1908.

Application filed March 15, 1907. Serial No. 362,484.

*To all whom it may concern:*

Be it known that I, OLE JENSEN, a subject of the King of Norway, residing at Chicago, in the county of Cook and State of Illinois, have invented a new and useful Improvement in Scissors, of which the following is a specification.

This invention relates to a pair of scissors or shears and the object of the invention is a tool of this kind in which the blades will be self-sharpening in which there will be a minimum of friction between the cutting blades, and in which the blades will be held in their proper relation to each other by means of side springs, thus obviating the necessity of a side thrust or pressure upon the part of the operator.

The invention consists of a pair of shears in which the blades are formed upon their inner faces and adjacent their cutting edges with a longitudinal groove and the cutting edge is an incline or oblique continuation of the wall of the groove.

In the drawings forming a part of this specification:—Figure 1 is a side elevation of a pair of shears constructed in accordance with my invention. Fig. 2 is a transverse section through the cutting blades, the same being shown in closed position. Fig. 3 is a transverse section upon the line of the pivot pin, the pin being shown in side elevation. Fig. 4 is a side elevation showing the inner face of one blade. Fig. 5 is a section similar to Fig. 3 and illustrating a modified form of spring.

In these drawings A represents the blades and each blade is provided adjacent its cutting edge with a longitudinal groove, A'. This groove extends from the point of the blade almost to the pivot pin and runs parallel to the cutting edge of the blade. Each cutting edge $A^2$ is a continuation of the wall of the groove and the inner face of the cutting edge is oblique with respect to the inner face of the body portion of the blade, and each cutting edge $A^2$ is practically an inclined flange extending inwardly toward the coöperating blade, each of said flanges being separated by a groove from the body portion of the blade of which it is an integral part. The blades are connected by the usual pivot pin B, and I mount upon the pivot pin and upon opposite sides of the blades, spring disks C, split radially as shown in Figs. 1 and 2, and are concavo-convex in cross-section. These springs bear upon the outer faces of the two blades and normally hold the same in cutting contact with each other. I can also employ a U-shaped spring D as shown in Fig. 5, the pivot pin B passing through perforations formed in the free end portions of the spring.

It will be obvious from the drawings that the extension of the cutting blades obliquely will prevent contact of the body portion of the blades, the cutting edges only contacting, thus avoiding the friction due to the sliding of non-cutting portions upon each other, except of course, in that portion of the blades through which the pivot pin B passes.

The operation of the springs C or D serves to press the blades together at the pivot point and to fold the cutting edges into contact with each other without the exertion of a lateral pressure upon the handle portion of the device by the operator, which pressure in some degree or other is often necessary upon shears of the usual construction.

Having thus fully described my invention, what I claim as new and desire to secure by Letters Patent, is:—

A pair of shears having cutting blades grooved longitudinally adjacent their cutting edges, and the cutting edges being inclined inwardly and forming the continuation of a wall of the groove.

OLE JENSEN.

Witnesses:
CHARLES CLAUSEN,
OSCAR J. TUFT.